United States Patent [19]

Degnan et al.

[11] Patent Number: 5,308,475
[45] Date of Patent: May 3, 1994

[54] USE OF ZSM-12 IN CATALYTIC CRACKING FOR GASOLINE OCTANE IMPROVEMENT AND CO-PRODUCTION OF LIGHT OLEFINS

[75] Inventors: Thomas F. Degnan, Moorestown, N.J.; Terry E. Helton, Glen Mills, Pa.

[73] Assignee: Mobil Oil Corporation, Fairfax, Va.

[21] Appl. No.: 979,963

[22] Filed: Nov. 23, 1992

[51] Int. Cl.$^5$ .................. C10G 11/05; C10G 11/02; C10G 11/00

[52] U.S. Cl. .................................. 208/120; 208/113; 208/114

[58] Field of Search ............... 208/120, 114, 111, 118

[56] References Cited

U.S. PATENT DOCUMENTS

| | | | |
|---|---|---|---|
| 3,140,249 | 7/1964 | Plank et al. | 208/120 |
| 3,140,251 | 7/1964 | Plank et al. | 208/120 |
| 3,140,252 | 7/1964 | Frilette et al. | 208/120 |
| 3,140,253 | 7/1964 | Plank et al. | 208/120 |
| 3,271,418 | 9/1966 | Plank et al. | 208/120 |
| 3,293,192 | 12/1966 | Maher et al. | 252/430 |
| 3,308,069 | 3/1967 | Wadlinger et al. | 252/455 |
| 3,442,795 | 5/1969 | Kerr et al. | 208/120 |
| 3,449,070 | 6/1969 | McDaniel et al. | 23/111 |
| 3,595,611 | 7/1971 | McDaniel et al. | 23/111 |
| 3,607,043 | 9/1971 | McDaniel et al. | 23/111 |
| 3,642,434 | 2/1972 | Dwyer | 23/113 |
| 3,758,403 | 9/1973 | Rosinski et al. | 208/120 |
| 3,769,202 | 10/1973 | Plank et al. | 208/111 |
| 3,832,449 | 8/1974 | Rosinski et al. | 423/328 |
| 3,894,931 | 7/1975 | Nace et al. | 208/73 |
| 3,894,933 | 7/1975 | Owen et al. | 208/77 |
| 3,894,934 | 7/1975 | Owen et al. | 208/78 |
| 3,957,623 | 5/1976 | McDaniel et al. | 208/120 |
| 3,972,983 | 8/1976 | Ciric | 423/328 |
| 4,016,218 | 4/1977 | Haag et al. | 260/671 R |
| 4,309,279 | 1/1982 | Chester et al. | 208/120 |
| 4,309,280 | 1/1982 | Rosinski et al. | 208/120 |
| 4,416,765 | 11/1983 | Chester et al. | 208/120 |
| 4,503,023 | 3/1985 | Breck et al. | 423/328 |
| 4,521,298 | 6/1985 | Rosinski et al. | 208/120 |
| 4,575,416 | 3/1986 | Chester et al. | 208/111 |
| 4,584,091 | 4/1986 | Pine | 208/114 |
| 4,740,292 | 4/1988 | Chen et al. | 208/120 |
| 4,865,718 | 9/1989 | Herbst et al. | 208/120 |
| 4,957,617 | 9/1990 | Owen et al. | 208/120 |

Primary Examiner—R. Bruce Breneman
Assistant Examiner—Lorna M. Douyon
Attorney, Agent, or Firm—Alexander J. McKillop; Dennis P. Santini; Lori F. Cuomo

[57] ABSTRACT

Heavy oils are subjected to catalytic cracking in the absence of added hydrogen using a catalyst containing a zeolite having the structure of ZSM-12 and a large-pore crystalline zeolite having a Constraint Index less than about 1. The process is able to effect a bulk conversion of the oil while at the same time yielding a higher octane gasoline and increased light olefin content.

16 Claims, 5 Drawing Sheets

FIG. 2B
▽ REY (CATALYST A)
□ ZSM-12/REY (CATALYST B)
△ ZSM-12/REY (CATALYST C)
○ ZSM-5/REY (CATALYST D)

▽ REY (CATALYST A)
□ ZSM-12/REY (CATALYST B)
△ ZSM-12/REY (CATALYST C)
○ ZSM-5/REY (CATALYST D)

FIG. 5A

FIG. 5B

USE OF ZSM-12 IN CATALYTIC CRACKING FOR GASOLINE OCTANE IMPROVEMENT AND CO-PRODUCTION OF LIGHT OLEFINS

FIELD OF THE INVENTION

This invention relates to improvements in catalytic cracking of hydrocarbon oils and, in particular, is directed to a process for the catalytic cracking of hydrocarbon oils to produce higher gasoline and distillate yields, increase gasoline octane number, and increase yields of $C_3$, $C_4$, and $C_5$ olefins. The cracking catalyst used is a mixture of a zeolite having the structure of ZSM-12 and a large-pore crystalline zeolite having a Constraint Index less than about 1. The cracking process takes place in the absence of added hydrogen.

BACKGROUND OF THE INVENTION

Catalytic cracking of hydrocarbon oils utilizing crystalline zeolites is a known process, practiced for example, in fluid-bed catalytic cracking (FCC) units, moving bed or thermofor catalytic cracking (TCC) reactors, and fixed-bed crackers.

Crystalline zeolites have been found to be particularly effective for the catalytic cracking of a gas oil to produce motor fuels, and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking, and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite with or without a matrix. A disclosure of this type is found in U.S. Pat. No. 3,769,202. Although the incorporation of a crystalline zeolite having a pore size of less than 7 Angstrom units into a catalyst composite comprising a large-pore size crystalline zeolite (pore size greater than 8 Angstrom units) has indeed been very effective with respect to raising the octane number, nevertheless it did so at the expense of the overall yield of gasoline.

Improved results in catalytic cracking with respect to both octane number and overall yield were achieved in U.S. Pat. No. 3,758,403. In the '403 patent, the cracking catalyst comprised a large-pore size crystalline zeolite (pore size greater than 7 Angstrom units) in admixture with a ZSM-5 zeolite, wherein the ratio of ZSM-5 zeolite to large-pore size crystalline zeolite was in the range of 1:10 to 3:1. Effective cracking processes were disclosed as being achieved when the catalyst was used to obtain the inherent advantages realized in moving bed techniques, such as the thermofor catalytic cracking process (TCC), as well as in fluidized cracking processes (FCC).

The use of ZSM-5 zeolite in conjunction with a zeolite cracking catalyst of the X or Y faujasite variety is described in U.S. Pat. Nos. 3 894 931; 3,894,933; and 3,894,934. The former two patents disclose the use of a ZSM-5 zeolite in amounts of about 5–10 wt.%; the latter patent discloses the weight ratio of ZSM-5 zeolite to large-pore size crystalline zeolite within the range of 1:10 to 3:1.

The addition of a separate additive or composite catalyst comprising ZSM-5 has been found to be extremely efficient as an octane and total yield improver, when used in very small amounts, in conjunction with a conventional cracking catalyst. Thus, in U.S. Pat. No. 4,309,279, it was found that only 0.1 to 0.5 wt.% of a ZSM-5 catalyst, added to a conventional cracking catalyst under 1–3 RON+O (Research Octane Number Without Lead).

U.S. Pat. No. 4,309,280 also teaches ZSM-5 and other zeolites in conjunction with a conventional cracking catalyst.

U.S. Pat. No. 4,740,292 to Chen et al. discloses catalytic cracking with a mixture of zeolite Beta and a faujasite zeolite.

U.S. Pat. Nos. 4,309,279; 4,309,280; and 4,521,298 disclose catalytic cracking processes characterized by the addition of very small amounts of additive promoter comprising a class of zeolites having a Constraint Index of about 1 to 12 to cracking catalysts.

U S. Pat. No. 4,416,765 discloses catalytic cracking using a catalyst comprising an amorphous cracking catalyst and a minor amount of a class of crystalline zeolites characterized by a silica to alumina ratio greater than about 12 and a Constraint Index of about 1 to 12.

SUMMARY OF THE INVENTION

In accordance with the present invention, there has now been discovered an improved process for upgrading total yield and octane number of gasoline boiling range product, increasing yields of $C_3$, $C_4$ and $C_5$ olefins and increasing isobutane. The desirable result is obtained by the use of a catalyst composition comprising ZSM-12 and one or more large-pore crystalline zeolites having a Constraint Index less than about 1. Large pore, crystalline zeolites useful in the process of the present invention include ZSM-4, ZSM-20, Mordenite, Zeolite Beta and faujasite-type zeolites. Faujasite-type zeolites are well known in the art and include Dealuminized Y, rare earth-exchanged zeolite Y (REY), ultrastable zeolite Y (USY) and rare earth-exchanged ultrastable zeolite Y (REUSY).

The hydrocarbon feedstock is heated with the catalyst composition under conversion conditions which are appropriate for cracking. External hydrogen is not added during the cracking process. During conversion, the alkylaromatics and the naphthenes which are present in the feedstock undergo cracking reactions, such as dealkylation, isomerization and ring opening. Additionally, paraffins in the feedstock crack and/or isomerize to lower molecular weight species.

The process enables heavy feedstocks, such as gas oils boiling above 420° F., to be converted to gasoline range products boiling below 420° F. and distillates in the 420° to 650° F. range. Use of the catalyst composition of this invention results in improved cracking activity over the base REY catalyst, increased octane numbers of the product gasoline and increased gasoline plus alkylate yield relative to the base REY catalyst alone.

DETAILED DESCRIPTION

Catalysts

The present hydrocarbon conversion process is an improved catalytic cracking process which involves converting a hydrocarbon feed over a cracking catalyst. The catalyst used in the process comprises a zeolite having the structure of ZSM-12 and a large-pore, crystalline zeolite having a Constraint Index less than about 1, such as REY, USY and REUSY.

ZSM-12 is described in U.S. Pat. No. 3,832,449, which is incorporated herein by reference. The weight ratio of the zeolite having the structure of ZSM-12 to the large-pore, crystalline zeolite having a Constraint Index less than about 1 is in the range of about 1:10 to about 10:1 and preferably in the range of about 1:10 to about 3:1.

As stated previously, another component of the catalyst mixture of the invention is a large-pore, crystalline zeolite having a Constraint Index less than about 1. More than one large-pore, crystalline zeolite having a Constraint Index less than about 1 may be used. The method by which Constraint Index is determined is described fully in U.S. Pat. No. 4,016,218, incorporated herein by reference for details of the method. Constraint Index (CI) for some typical zeolites including some which are suitable as catalyst components in the catalytic cracking process of this invention are as follows:

| | CI (at test temperature) |
|---|---|
| ZSM-4 | 0.5 (316° C.) |
| ZSM-5 | 6-8.3 (371° C.-316° C.) |
| ZSM-11 | 5-8.7 (371° C.-316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| MCM-22 | 1.5 (454° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |

-continued

| | CI (at test temperature) |
|---|---|
| Zeolite Beta | 0.6-2.0 (316° C.-399° C.) |

The above-described Constraint Index provides a definition of those zeolites which are particularly useful as the large-pore crystalline zeolite component in the present process.

The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of binder material. Similarly, other variables such as crystal size of the zeolite, the presence of occluded contaminants, etc., may affect the observed Constraint Index value. It will therefore be appreciated that it may be possible to select test conditions, e.g., temperature, as to establish more than one value for the Constraint Index of a particular zeolite. This explains the range of Constraint Indices for some zeolites, such as ZSM-5, ZSM-11, and Beta.

The large-pore, crystalline zeolites having a CI less than about 1 which are useful in the process of this invention are well known in the art and have a pore size sufficiently large to admit the vast majority of components normally found in the feedstock. The zeolites are generally stated to have a pore size in excess of 7 Angstroms and are represented by zeolites having the structure of, e.g., ZSM-4, ZSM-20, Mordenite, Zeolite Beta, Dealuminized Y, REY, USY and REUSY. A crystalline silicate zeolite well known in the art and useful in the present invention is faujasite. The ZSM-20 zeolite resembles faujasite in certain aspects of structure but has a notably higher silica/alumina ratio than faujasite, as does Dealuminized Y.

ZSM-4 is described in U.S. Pat. No. 3,642,434, incorporated herein by reference.

ZSM-20 is described in U.S. Pat. No. 3,972,983, incorporated herein by reference.

Mordenite is described in U.S. Pat. No. 4,503,023, incorporated herein by reference.

Dealuminized Y zeolite is described in U.S. Pat. No. 3,442,795, incorporated herein by reference.

Zeolite Beta is described in U.S. Pat. No. 3,308,069 and RE 28,341, incorporated herein by reference.

Zeolites of particular use include REY, USY, and REUSY.

REY is described in U.S. Pat. Nos. 3,595,611 and 3,607,043, incorporated herein by reference.

Low sodium Ultrastable Y molecular sieve (USY) is described in U.S. Pat. Nos. 3,293,192 and 3,449,070, incorporated herein by reference.

REUSY is described in U.S. Pat. No. 3,957,623, incorporated herein by reference.

It may be desirable to incorporate the zeolites into a material resistant to the temperature and other conditions employed in the process. Such matrix materials include synthetic and naturally occurring substances, such as inorganic materials, e.g., clay, silica, and metal oxides. The latter may be either naturally occurring or in the form of gelatinous precipitates or gels, including mixtures of silica and metal oxides. Naturally occurring clays can be composited with the zeolites, including those of the montmorillonite and kaolin families. These clays can be used in the raw state as originally mined or initially subjected to calcination, acid treatment, or chemical modification.

The zeolites may be composited with a porous matrix material, such as alumina, silica-alumina, silica-magnesia, silica-zirconia, silica-thoria, silica-beryllia, silica-titania, as well as ternary compositions such as silica-alumina-thoria, silica-alumina-zirconia, silica-alumina-magnesia, and silica-magnesia-zirconia. The matrix may be in the form of a cogel or sol. The relative proportions of zeolite component and inorganic oxide gel matrix on an anhydrous basis may vary widely with the zeolite content ranging from 5 to 99, more usually 10 to 65, wt.% of the dry composite. The matrix itself may possess catalytic properties, generally of an acidic nature, and may be impregnated with a combustion promoter, such as platinum, to enhance a carbon monoxide combustion.

The matrix material may include phosphorus that is derived from a water soluble phosphorus compound including phosphoric acid, ammonium dihydrogen phosphate, diammonium hydrogen phosphate, ammonium phosphate, ammonium hypophosphate, ammonium phosphite, ammonium hypophosphite and ammonium dihydrogen orthophosphite.

The zeolite having the structure of ZSM-12 and the large-pore, crystalline zeolite having a Constraint Index less than about 1 may be used on separate catalyst particles, i.e., a mixture of the catalysts. The ZSM-12 zeolite and the large-pore, crystalline zeolite may also be used as a composite, i.e., catalyst particles containing both zeolites in the same particle.

The ZSM-12 and the large-pore, crystalline zeolite may be combined, blended, dispersed, or otherwise intimately admixed or composited with a porous matrix in such proportions that the resulting product contains 1 to 95 wt%, and preferably 10 to 70 wt.% of the total zeolites in the final composite. In a moving bed process, the use of a composite catalyst may be preferred; but in a fluid process a mixture is satisfactory.

Feedstock

The feedstock of the present conversion process comprises a heavy hydrocarbon oil, such as gas oil, coker tower bottoms fraction reduced crude, vacuum tower bottoms, deasphalted vacuum resids, FCC tower bottoms, and cycle oils. Oils derived from coal, shale or tar sands may also be treated in this way. Oils of this kind generally boil about 650° F. (343° C.) although this process is also useful with oils which have initial boiling points as low as 500° F. (260° C.). These heavy oils comprises high molecular weight long-chain paraffins, naphthenes and high molecular weight aromatics with a large proportion of fused ring aromatics. The heavy hydrocarbon oil feedstock will normally contain a substantial amount boiling above 450° F. and will normally have an initial boiling point of about 550° F. (288° C.), more usually about 650° F. (343° C.). Typical boiling ranges will be about 650° to about 1050° F. (566° C.), or about 650° to 950° F. (510° C.), but oils with a narrower boiling range may, of course, be processed, for example, those with a boiling range of about 650° to 850° F. (454° C.). Heavy gas oils are often of this kind, as are cycle oils and other nonresidual materials. It is possible to co-process materials boiling below 500° F., but the degree of conversion will be lower for such components. Feedstocks containing lighter ends of this kind will normally have an initial boiling point above about 300° F.

Process Conditions

The processing is carried out under conditions similar to those used for conventional catalytic cracking. Process temperatures of 750° to 1200° F. may conveniently be used, although temperatures above 1050° F. will normally not be employed. Generally, temperatures of 840° to 1050° F. (449°-566° C.) will be employed. The space velocity of the feedstock will normally be from 0.1 to 20 LHSV, preferably 0.1 to 10 LHSV.

The conversion may be conducted by contacting the feedstock with a fixed stationary bed of catalyst, a fluidized bed, or with a transport bed. The catalyst may be regenerated by burning in air or other oxygen-containing gas.

A preliminary hydrotreating step to remove the nitrogen and sulfur and to saturate aromatics to naphthenes without substantial boiling range conversion will usually improve catalyst performance and permit lower temperatures, higher space velocities, or combinations of these conditions to be employed.

The following examples illustrate the process of the present invention.

Catalyst A

A commercially available FCC catalyst which comprises about 15 wt% REY is used as the base catalyst. This catalyst is withdrawn from a commercial FCC unit after oxidative regeneration. The catalyst contains 560 ppm V, 260 ppm Ni and 1.7 wt% rare earth oxide. The catalyst has a unit cell size of 24.41 Angstroms and is henceforth referred to as Catalyst A.

Catalyst B

A catalyst for use in the present process is prepared by spray drying an aqueous slurry containing 25 wt.% ZSM-12, synthesized in accordance with U.S. Pat. No. 3,832,449, in a $SiO_2$-$Al_2O_3$ gel/clay matrix. The spray dried catalyst is ammonium exchanged and calcined. The calcination is carried out at 1000° F. for 2 hours in air followed by steaming the catalyst for 4 hours at 1200° F. in a 45% steam/55% air mixture at 0 psig. One part by weight ZSM-12 catalyst is then blended with 3 parts by weight REY catalyst (Catalyst A) to provide a cracking catalyst having 6.25 wt% ZSM-12/11.25 wt% REY and is henceforth referred to as Catalyst B.

Catalyst C

A catalyst for use in the process of the present invention is prepared by spray drying an aqueous slurry containing 40 wt.% ZSM-12, synthesized in accordance with U.S. Pat. No. 3,832,449, in a $SiO_2$-$Al_2O_3$-$H_3PO_4$ sol/clay matrix. The spray dried catalyst is ammonium exchanged and calcined. The calcination is carried out at 1000° F. for 2 hours in air. One part by weight ZSM-12 catalyst is then blended with 3 parts by weight REY catalyst (Catalyst A) to provide a cracking catalyst having 8.0 wt% ZSM-12/11.25 wt% REY and is henceforth referred to as Catalyst C.

Catalyst D

This is a catalyst blend used for comparative purposes comprising ZSM-5 and Catalyst A to show that the ZSM-12/large-pore, crystalline zeolite catalysts of the present invention selectively enhance the yield of $C_4$ olefins over the ZSM-5/large-pore, crystalline zeolite catalyst. A commercially available ZSM-5 fluid catalyst which comprises about 25 wt.% ZSM-5 in a SiO$_2$-Al$_2$O$_3$-clay matrix is calcined at 1000° F. for 2 hours in air followed by steaming the catalyst for 4 hours at 1200° F. in a 45% steam/55% air mixture at 0 psig. One part by weight ZSM-5 catalyst is then blended with 3 parts by weight REY catalyst (Catalyst A) to provide a cracking catalyst having 6.25 wt.% ZSM-5/11.25 wt.% REY and is henceforth referred to as Catalyst D.

EXAMPLE 1

Catalysts A, B, C, and D were evaluated in a fixed-fluidized bed (FFB) unit at a temperature of 960° F., a 1.0 minute contact time and atmospheric pressure (0 psig) using a Sour Heavy Gas Oil (SHGO) having the properties as shown in Table 1.

TABLE 1

| Properties of Joliet Sour Heavy Gas Oil | |
| --- | --- |
| Pour Point, °F. | 95 |
| Conradson Carbon Residue (CCR), wt. % | 0.56 |
| Kinematic Viscosity (K.V.) @ 40° C. | 104.8 |
| Kinematic Viscosity (K.V.) @ 100° C. | 7.95 |
| Aniline Point, °F. | 168.5 |
| Bromine Number | 6.9 |
| Gravity, API | 20.1 |
| Carbon, wt. % | 85.1 |
| Hydrogen, wt. % | 12.1 |
| Sulfur, wt. % | 2.6 |
| Nitrogen, wt. % | 0.2 |
| Total, wt. % | 100.0 |
| Basic Nitrogen, ppm | 465 |
| Nickel, ppm | 0.5 |
| Vanadium, ppm | 0.3 |
| Iron, ppm | 1.2 |
| Copper, ppm | <0.1 |
| Sodium, ppm | 0.8 |

A range of conversions were scanned by varing the catalyst to oil ratio. The fixed-fluidized bed results, after interpolation to 65 vol% conversion, are summarized in Tables 2 and 3 below.

TABLE 2

| | Catalyst A | Catalyst B | Catalyst C | Catalyst D |
| --- | --- | --- | --- | --- |
| C$_5$+ Gasoline, vol. % | 52.4 | 49.9 | 40.0 | 37.4 |
| Gasoline + alkylate, vol. % | 71.2 | 72.4 | 74.4 | 73.8 |
| Alkylate, vol. % | 18.8 | 22.6 | 34.4 | 36.5 |
| RON, C$_5$+ Gasoline | 90.5 | 91.4 | 93.2 | 93.6 |
| RON, C$_5$+ Gasoline + Alkylate | 91.4 | 92.2 | 93.5 | 93.6 |
| Coke, wt. % | 6.2 | 5.3 | 6.0 | 5.8 |
| Light Fuel Oil (LFO), wt. % | 29.3 | 29.0 | 28.3 | 28.9 |
| Heavy Fuel Oil (HFO), wt. % | 7.8 | 8.3 | 9.5 | 8.8 |
| Gasoline + Distillate (G + D), wt. % | 71.9 | 69.8 | 60.9 | 59.7 |
| Total C$_3$, vol. % | 7.7 | 8.9 | 15.8 | 18.8 |
| Total C$_4$, vol. % | 11.7 | 14.7 | 19.9 | 19.4 |
| n-C$_5$, vol. % | 0.4 | 0.3 | 0.5 | 0.3 |
| N-C$_4$, vol. % | 0.8 | 0.2 | 0.2 | 0.1 |
| C$_3$, vol. % | 1.9 | 2.9 | 4.5 | 4.9 |
| i-C$_5$, vol. % | 5.3 | 6.1 | 5.0 | 5.0 |
| i-C$_4$, vol. % | 5.5 | 7.2 | 10.4 | 11.1 |
| Outside i-C$_4$ for Alkylate, vol. % | 7.3 | 8.1 | 13.2 | 14.0 |
| Light Gases | | | | |
| Light Gas, wt. % | 2.5 | 2.5 | 2.5 | 3.2 |
| C$_2$, wt. % | 0.5 | 0.4 | 0.5 | 0.5 |
| C$_2$=, wt. % | 0.5 | 0.3 | 0.5 | 0.9 |
| C$_1$, wt. % | 0.5 | 0.4 | 0.5 | 0.6 |

TABLE 2-continued

| | Catalyst A | Catalyst B | Catalyst C | Catalyst D |
| --- | --- | --- | --- | --- |
| H$_2$, wt. % | 0.17 | 0.11 | 0.13 | 0.17 |
| H$_2$S, wt. % | 0.93 | 1.26 | 0.78 | 0.99 |
| Hydrogen Factor | 146 | 107 | 94 | 95 |

TABLE 3

| | Catalyst A | Catalyst B | Catalyst C | Catalyst D |
| --- | --- | --- | --- | --- |
| Olefin Yield | | | | |
| Propylene, vol % | 5.8 | 6.0 | 11.3 | 13.9 |
| Butenes, vol. % | 5.4 | 7.5 | 9.3 | 8.2 |
| Pentenes, vol. % | 4.2 | 5.3 | 5.0 | 3.9 |
| Total, vol. % | 15.4 | 18.8 | 25.6 | 26.0 |
| Olefin/Paraffin Selectivity | | | | |
| Propylene/Propane | 3.1 | 2.1 | 2.5 | 2.8 |
| Butenes/Butanes | 0.9 | 1.0 | 0.9 | 0.7 |
| Pentenes/Pentanes | 0.7 | 0.8 | 0.9 | 0.7 |
| Olefin Selectivity | | | | |
| C$_3$=/Total (C$_3$= + C$_4$= + C$_5$=) | 0.38 | 0.32 | 0.44 | 0.53 |
| C$_4$=/Total (C$_3$= + C$_4$= + C$_5$=) | 0.35 | 0.40 | 0.36 | 0.32 |
| C$_5$=/Total (C$_3$= + C$_4$= + C$_5$=) | 0.27 | 0.28 | 0.20 | 0.15 |

Figure 1A:
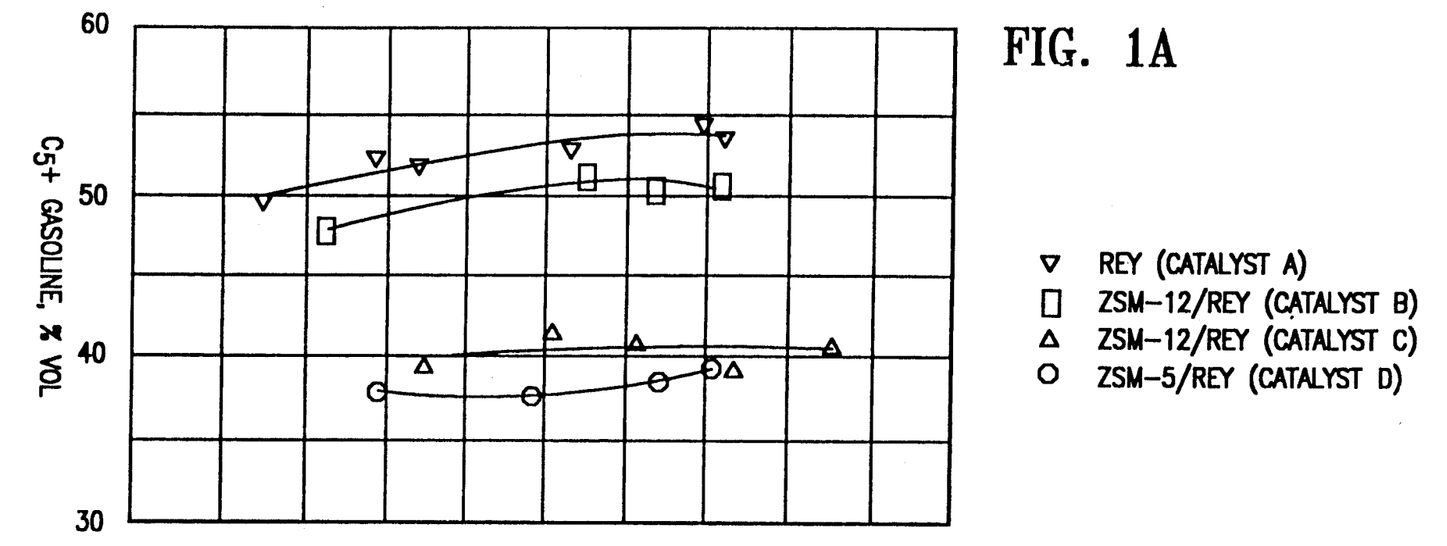
FIG. 1A is a plot illustrating the relationship of $C_5$+gasoline yield to activity (% conversion).
Figure 1B:
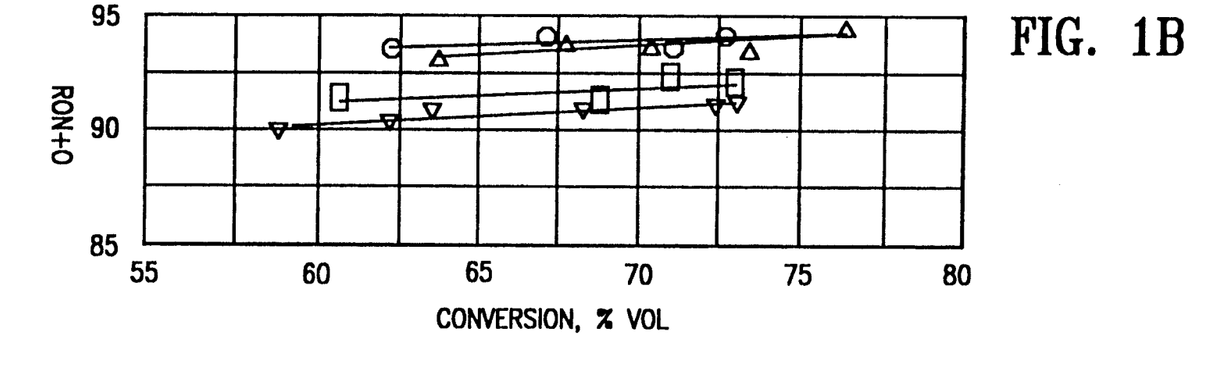
FIG. 1B is a plot illustrating the relationship of octane number of $C_5$+gasoline to activity (% conversion).

FIGS. 1A and 1B compare the C$_5$+catalytically cracked gasoline yield and RON as a function of 650° F.+conversion. FIGS. 1A and 1B show the use of ZSM-12 produces a significant drop in gasoline yield and a concomitant increase in RON. The ZSM-12/REY catalysts (Catalysts B and C) show enhanced activity as measured by RON as compared to the base REY catalyst alone (Catalyst A). The RON boosts are in the 1–2 range.

Figure 2A:
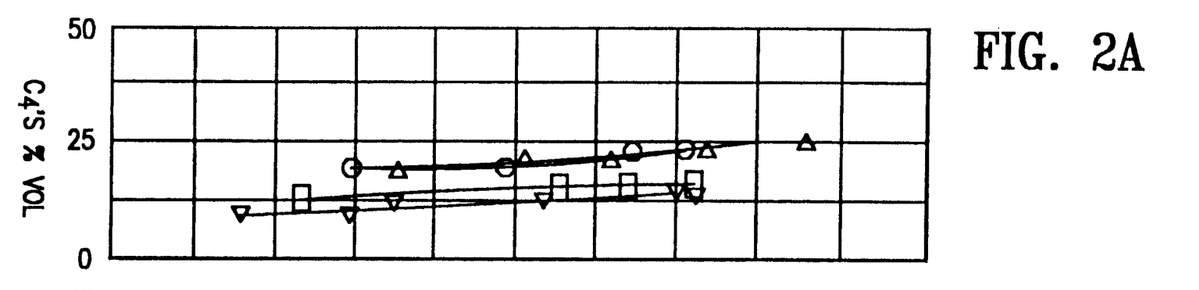
FIG. 2A is a plot illustrating the relationship of total $C_4$'s yield to activity (% conversion).
Figure 2B:
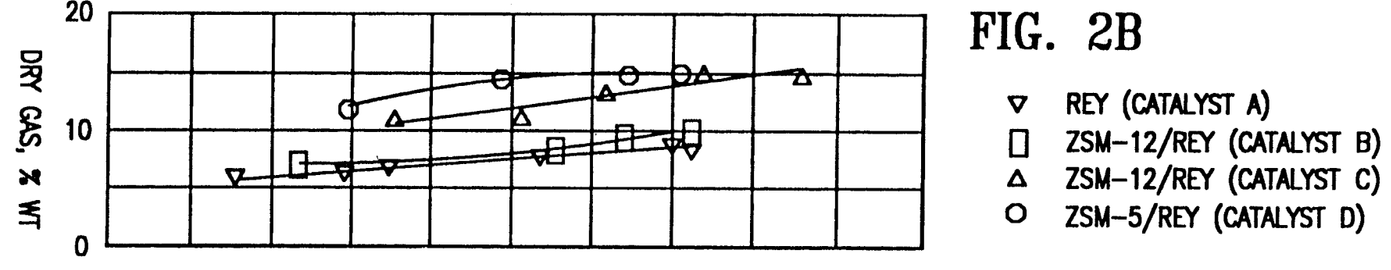
FIG. 2B is a plot illustrating the relationship of dry gas ($C_3-$ yield to activity (% conversion).
Figure 2C:
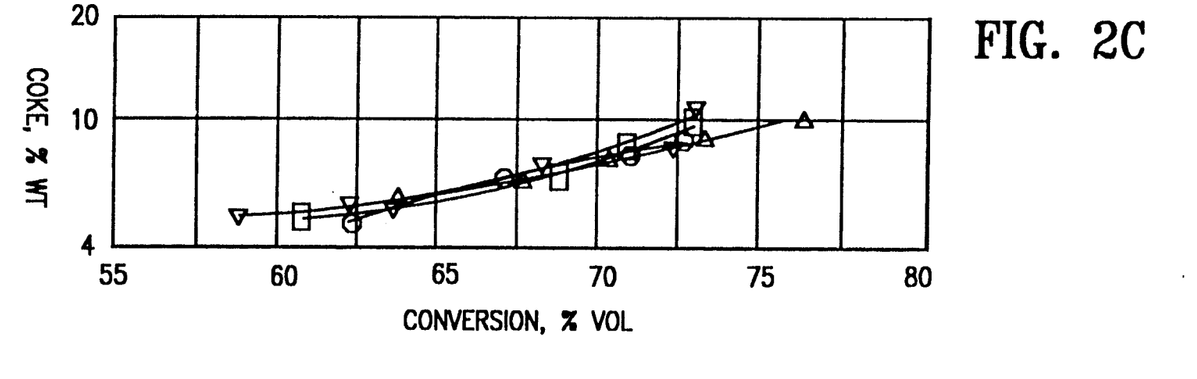
FIG. 2C is a plot illustrating the relationship of coke yield to activity (% conversion).

FIGS. 2A, 2B and 2C compare the C$_4$, dry gas and coke yields as function of 650° F.+conversion. FIGS. 2A and 2B show the use of ZSM-12/REY catalysts (Catalysts B and C) increase the amount of C$_4$'s (butenes+butanes) produced while increasing dry gas (H$_2$S+H$_2$+C$_1$+C$_2$+C$_3$) only marginally. C$_4$'s are more desirable than dry gas. The use of ZSM-12/REY catalysts also result in no change in coke make.

Figure 3A:
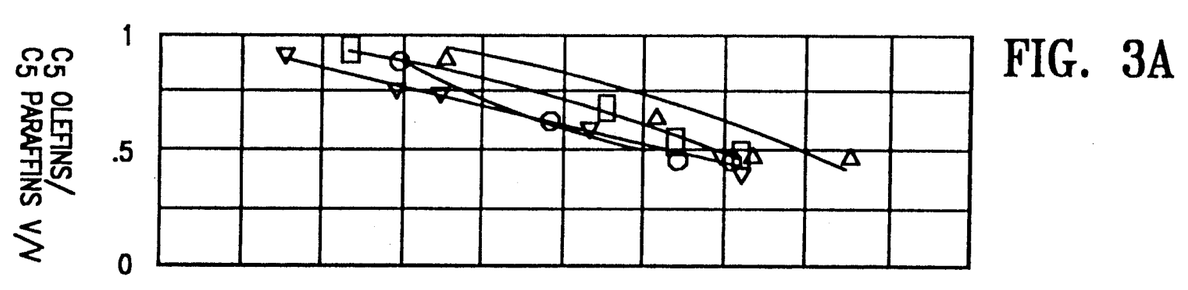
FIG. 3A is a plot illustrating the relationship of % pentenes/pentanes yield to activity (% conversion).
Figure 3B:
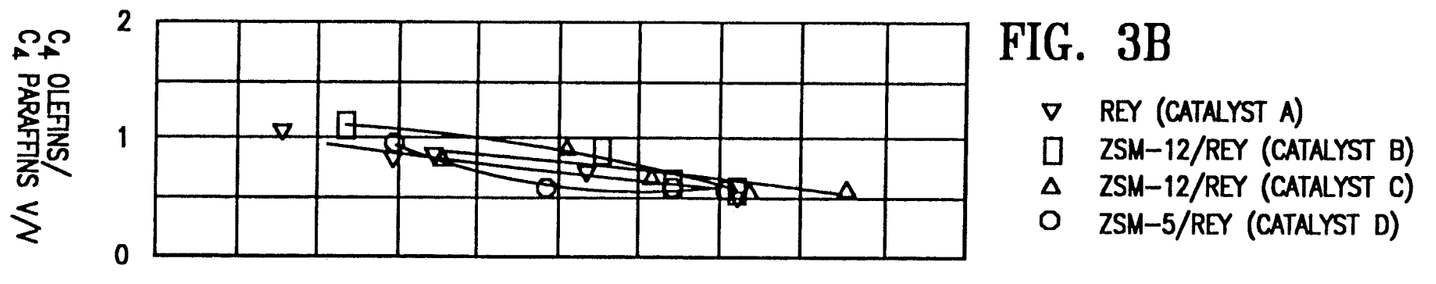
FIG. 3B is a plot illustrating the relationship of % butenes/butanes yield to activity (% conversion).
Figure 3C:
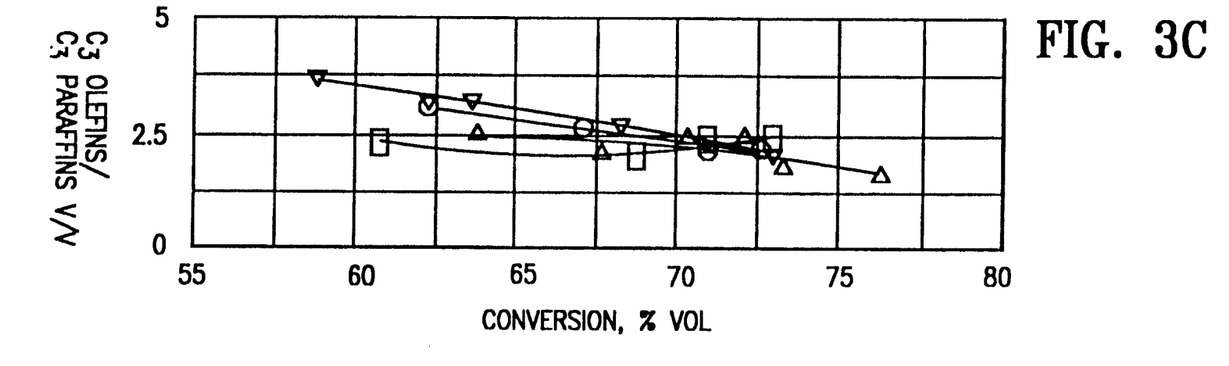
FIG. 3C is a plot illustrating the relationship of % propenes/propanes yield to activity (% conversion).

FIGS. 3A, 3B and 3C compare the olefin to paraffin ratio for the light gases (C$_3$ through C$_5$) as a function of 650° F.+conversion. FIG. 3C shows that the ZSM-12/REY catalysts (Catalyst B and C) reduce the olefinicity of the C$_3$ components while increasing the olefinicity of the C$_4$ and C$_5$ components, as shown in FIGS. 3A and 3B. C$_4$ and C$_5$ olefins are valuable for methyl tert butyl ether (MTBE) and tertiary amyl methyl ether (TAME) production which are major components in oxygenated gasoline.

FIG. 3B in conjunction with Table 3 further shows that ZSM-12/REY catalysts (Catalysts B and C) are also more selective toward C$_4$ olefins (butenes) than the ZSM-5/REY catalyst (Catalyst D). Butenes are the preferred feedstock for alkylation and for MTBE production.

Figure 4A:
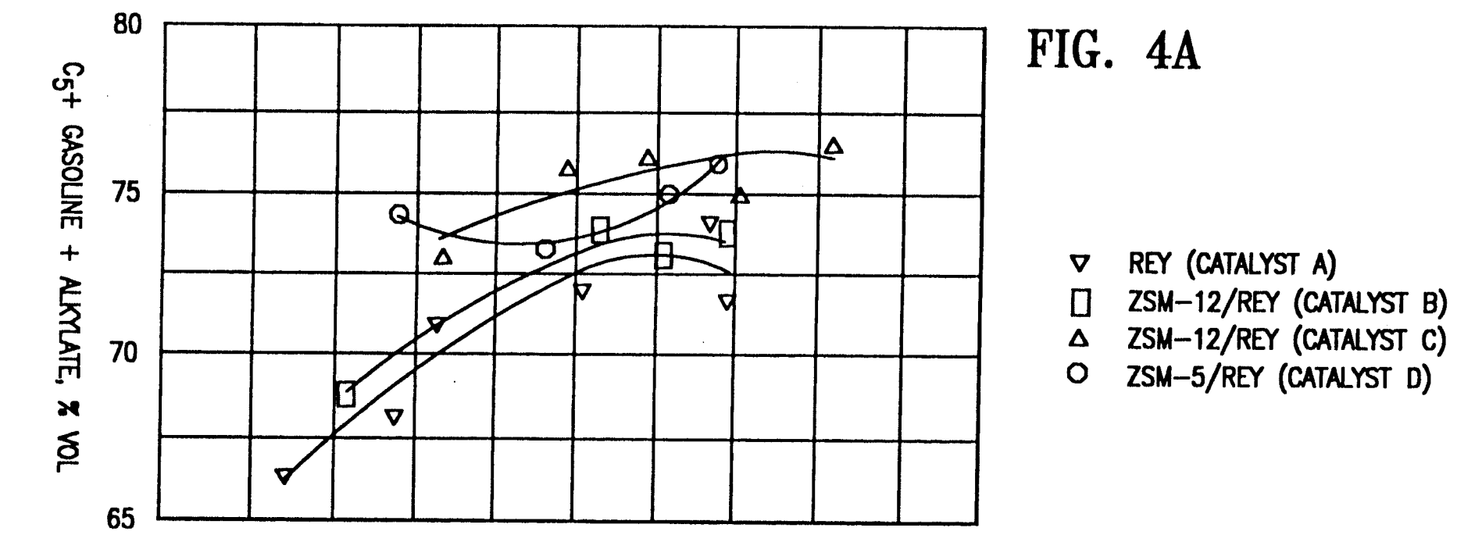
FIG. 4A is a plot illustrating the relationship of $C_5+$gasoline+alkylate yield to activity (% conversion).
Figure 4B:
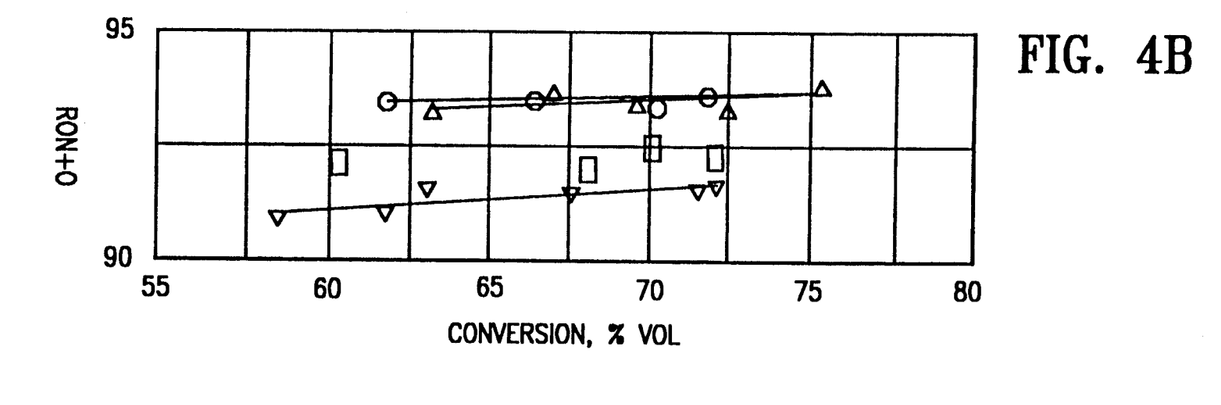
FIG. 4B is a plot illustrating the relationship of octane number of $C_5+$gasoline+alkylate to activity (% conversion).

FIGS. 4A and 4B compare the C$_5$ +catalytically cracked gasoline+alkylate, which equals the net gasoline from the process, and RON as a function of 650° F.+conversion. FIG. 4A shows that the ZSM-12/REY catalysts (Catalysts B and C) make more net gasoline than REY (Catalyst A) alone. FIG. 4B shows that the ZSM-12/REY catalysts (Catalysts B and C) also produce a higher octane gasoline product as measured by RON.

Figure 5A:
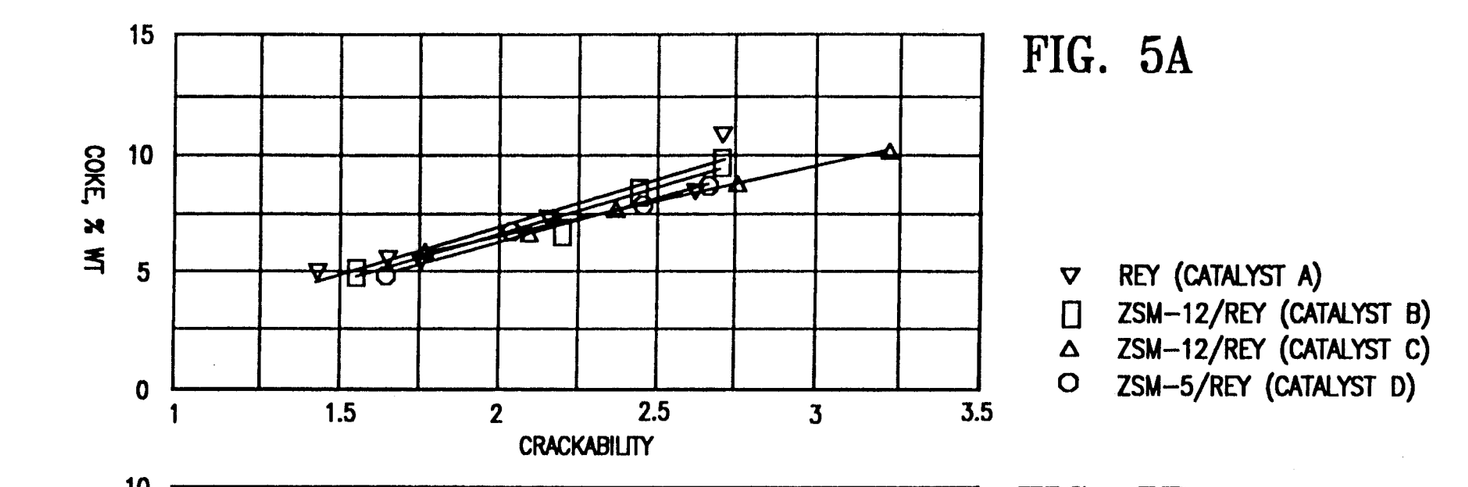
FIG. 5A is a plot illustrating the relationship of coke yield to crackability.
Figure 5B:
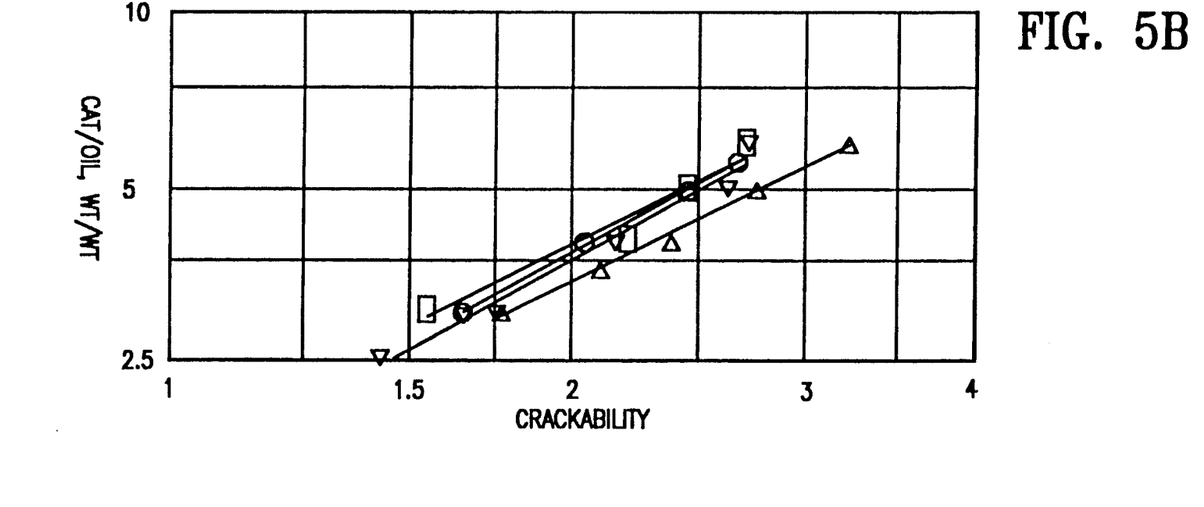
FIG. 5B is a plot illustrating the relationship of catalyst/oil ratio to crackability.

FIGS. 5A and 5B compare the coke make and the required catalyst to oil ratio versus crackability. Crackability is defined here as the ratio of fractional conversion to 1-fractional conversion and is a kinetic parameter that reflects the global second order kinetics of the cracking reaction. Higher crackabilities correspond to higher conversions. FIG. 5A shows that at the same crackability (~ conversion), the addition of the ZSM-12 (Catalysts B and C) has little effect on coke make. At equivalent crackabilities higher catalyst to oil ratios correspond to lower catalyst activity. FIG. 5B shows that the unsteamed ZSM-12 (Catalyst C) produces a slightly more active catalyst while the steamed ZSM-12 (Catalyst B) is marginally less active than the base REY (Catalyst A) with which it is combined.

Changes and modifications in the specifically described embodiments can be carried out without departing from the scope of the invention which is intended to be limited only by the scope of the appended claims.

We claim:

1. A catalytic cracking process which comprises catalytically cracking a hydrocarbon feed in the absence of added hydrogen with a cracking catalyst comprising a zeolite having the structure of ZSM-12 and a large-pore, crystalline zeolite having a Constraint Index less than about 1, the weight ratio of the zeolite having the structure of ZSM-12 to the large-pore crystalline zeolite component being in the range of from about 1:10 to about 7:10.

2. A process according to claim 1 wherein in which the large-pore, crystalline zeolite is selected from the group consisting of REY, USY, REUSY, ZSM-4, ZSM-20, Mordenite, Dealuminized Y and Zeolite Beta.

3. A process according to claim 1 in which the large-pore, crystalline zeolite is selected from the group consisting of REY, USY and REUSY.

4. A process according to claim 1 in which the large-pore zeolite is REY.

5. A process according to claim 1 in which the the cracking catalyst comprises a composite of the zeolite having the structure of ZSM-12 and the large-pore, crystalline zeolite.

6. A process according to claim 1 in which the cracking catalyst comprises the zeolite having the structure of ZSM-12 and the large-pore, crystalline zeolite as separately matrixed components of a mixture.

7. A process according to claim 6 in which the mixture comprises about 25 wt% of the component comprising the zeolite having the structure of ZSM-12 and about 75 wt.% of the component comprising the large-pore, crystalline zeolite.

8. A process according to claim 7 wherein said large-pore, crystalline zeolite is REY.

9. A process according to claim 1 in which the catalytic cracking is carried out as a fluid catalytic cracking process.

10. A process according to claim 1 in which the catalytic cracking is carried out in a moving bed.

11. A process according to claim 1 in which the catalytic cracking process is carried out a a temperature in the range of from about 750° to about 1050° F.

12. A process according to claim 1 in which the zeolite having the structure of ZSM-12 is combined with a matrix and a water soluble phosphorus compound.

13. A process according to claim 1 in which the zeolite having the structure of ZSM-12 is combined with a porous matrix in an amount of about 25 wt.% zeolite having the structure of ZSM-12.

14. A process according to claim 1 in which the zeolite having the structure of ZSM-12 is combined with a porous matrix in an amount of about 40 wt.% zeolite having the structure of ZSM-12.

15. A process for cracking a gas oil to produce a gasoline product of improved octane rating, which comprises catalytically cracking a hydrocarbon feed in the absence of added hydrogen with a cracking catalyst comprising a zeolite having the structure of ZSM-12 and a large-pore, crystalline zeolite having a Constraint Index less than about 1, the weight ratio of the zeolite having the structure of ZSM-12 to the large-pore crystalline zeolite being in the range of from about 1:10 to about 7:10.

16. A catalytic cracking process elective towards the production of $C_4$ olefins which comprises catalytically cracking a hyrdocarbon feed in the absence of added hydrogen with a cracking catalyst comprising a zeolite having the structure of ZSM-12 and a large-pore, crystalline zeolite having a Constraint Index less than about 1, the weight ratio of the zeolite having the structure of ZSM-12 to the large-pore crystalline zeolite component being in the range of from about 1:10 to about 7:10.

* * * * *